US010785787B2

(12) United States Patent
Golitschek Edler von Elbwart et al.

(10) Patent No.: US 10,785,787 B2
(45) Date of Patent: Sep. 22, 2020

(54) COMMUNICATING UCI IN AUTONOMOUS UPLINK TRANSMISSIONS

(71) Applicant: Lenovo (Singapore) PTE. LTD., New Tech Park (SG)

(72) Inventors: Alexander Johann Maria Golitschek Edler von Elbwart, Darmstadt (DE); Joachim Loehr, Wiesbaden (DE); Prateek Basu Mallick, Langen (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/148,562

(22) Filed: Oct. 1, 2018

(65) Prior Publication Data
US 2019/0104535 A1  Apr. 4, 2019

Related U.S. Application Data

(60) Provisional application No. 62/566,134, filed on Sep. 29, 2017.

(51) Int. Cl.
*H04W 72/12* (2009.01)
*H04L 1/18* (2006.01)
*H04L 1/00* (2006.01)

(52) U.S. Cl.
CPC ....... *H04W 72/1268* (2013.01); *H04L 1/0033* (2013.01); *H04L 1/1812* (2013.01); *H04L 1/1896* (2013.01)

(58) Field of Classification Search
CPC ............. H04W 72/1268; H04L 1/1896; H04L 1/0033; H04L 1/1812
See application file for complete search history.

(56) References Cited

U.S. PATENT DOCUMENTS

| | | | | |
|---|---|---|---|---|
| 2017/0127316 A1* | 5/2017 | Chen | ...................... | H04W 28/06 |
| 2018/0310334 A1* | 10/2018 | Mukherjee | ............ | H04L 5/0053 |
| 2019/0014562 A1* | 1/2019 | Yasukawa | ............. | H04W 28/06 |
| 2019/0394673 A1* | 12/2019 | Hwang | ................. | H04W 28/04 |

(Continued)

FOREIGN PATENT DOCUMENTS

WO    2017070901 A1    5/2017

OTHER PUBLICATIONS

PCT/IB2018/001205, "Notification of Transmittal of the International Seach Report and the Written Opinion of the International Searching Authority, or The Declaration", International Searching Authority, dated Mar. 8, 2019, pp. 1-56.

(Continued)

*Primary Examiner* — Omar J Ghowrwal
(74) *Attorney, Agent, or Firm* — Kunzler Bean & Adamson

(57) ABSTRACT

Apparatuses, methods, and systems are disclosed for communicating uplink control information ("UCI") with cyclic redundancy check ("CRC") in an autonomous uplink ("AUL") transmission. One apparatus includes a processor and a transceiver that receives a control signal to enable AUL transmission. The processor determines to transmit data in an AUL transmission and generates UCI for the AUL transmission, wherein the UCI comprises a CRC, wherein the UCI further indicates an identifier of the apparatus. The processor transmits, via the transceiver, the UCI with the AUL transmission, wherein the AUL transmission comprises the UCI.

12 Claims, 6 Drawing Sheets

(56) References Cited

U.S. PATENT DOCUMENTS

2020/0068606 A1* 2/2020 Zhang .............. H04W 72/0466

OTHER PUBLICATIONS

Vivo, "RNTI and CRC size for NR", 3GPP TSG RAN Meeting #88, R1-1703387, Feb. 13-17, 2017, pp. 1-4, Athens, Greece.
Ericsson, "On AUL Support on LAA sCell", 3GPP TSG RAN WG1 Meeting #90, R1-1713310, Aug. 12-25, 2017, pp. 1-5, Prague, Czech Republic.

* cited by examiner

COMMUNICATING UCI IN AUTONOMOUS UPLINK TRANSMISSIONS

CROSS-REFERENCE TO RELATED APPLICATIONS

This application claims priority to U.S. Provisional Patent Application No. 62/566,134 entitled "CRC Scrambling for UCI in autonomous uplink transmission" and filed on Sep. 29, 2017 for Alexander Johann Maria Golitschek Edler von Elbwart, Joachim Lohr, and Prateek Basu Mallick, which is incorporated herein by reference.

FIELD

The subject matter disclosed herein relates generally to wireless communications and more particularly relates to communicating UCI with CRC in an autonomous uplink transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PD-CCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, autonomous uplink ("AUL") transmission may be used. In such networks, UCI is to accompany AUL transmissions.

BRIEF SUMMARY

Apparatuses for communicating UCI with CRC in an autonomous uplink transmission are disclosed. Methods and systems also perform the functions of the apparatuses. One method (e.g., of a UE) includes determining (e.g., at the UE) to transmit data in an autonomous uplink ("AUL") transmission. The method includes generating uplink control information ("UCI") for the AUL transmission, wherein the UCI comprises a cyclic redundancy check ("CRC"), wherein the UCI further indicates an identifier of the remote unit. The method includes transmitting, to a base unit, the UCI with the AUL transmission, wherein the AUL transmission comprises the UCI.

In some embodiments, the UCI consists of a hybrid automatic repeat request ("HARQ") process identifier, a new data indicator, a redundancy version ("RV") value, a remote unit identification field, and the CRC. In such embodiments, the identifier may be a radio network temporary identifier ("RNTI"). In certain embodiments, the RNTI may be one of a cell RNTI ("C-RNTI") and an AUL-specific RNTI ("AUL-RNTI").

In some embodiments, both the CRC and the identifier of the remote unit have a size of 16 bits. In certain embodiments, generating the UCI for the AUL transmission comprises scrambling the CRC using the identifier of the remote unit. In such embodiments, the UCI may consist of a hybrid automatic repeat request ("HARQ") process identifier, a new data indicator, a redundancy version ("RV") value, and the scrambled CRC.

In certain embodiments, the identifier consists of a first portion and a second portion, wherein both the CRC and the second portion are a common size, and wherein generating the UCI for the AUL transmission comprises scrambling the CRC with the second portion of the identifier. In such embodiments, the UCI may consist of a hybrid automatic repeat request ("HARQ") process identifier, a new data indicator, a redundancy version ("RV") value, the first portion of the identifier, and the scrambled CRC. In certain embodiments, the identifier may a radio network temporary identifier ("RNTI"), wherein the first portion of the identifier consists of the most significant bits of the RNTI and the second portion of the identifier consists of the least significant bits of the RNTI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
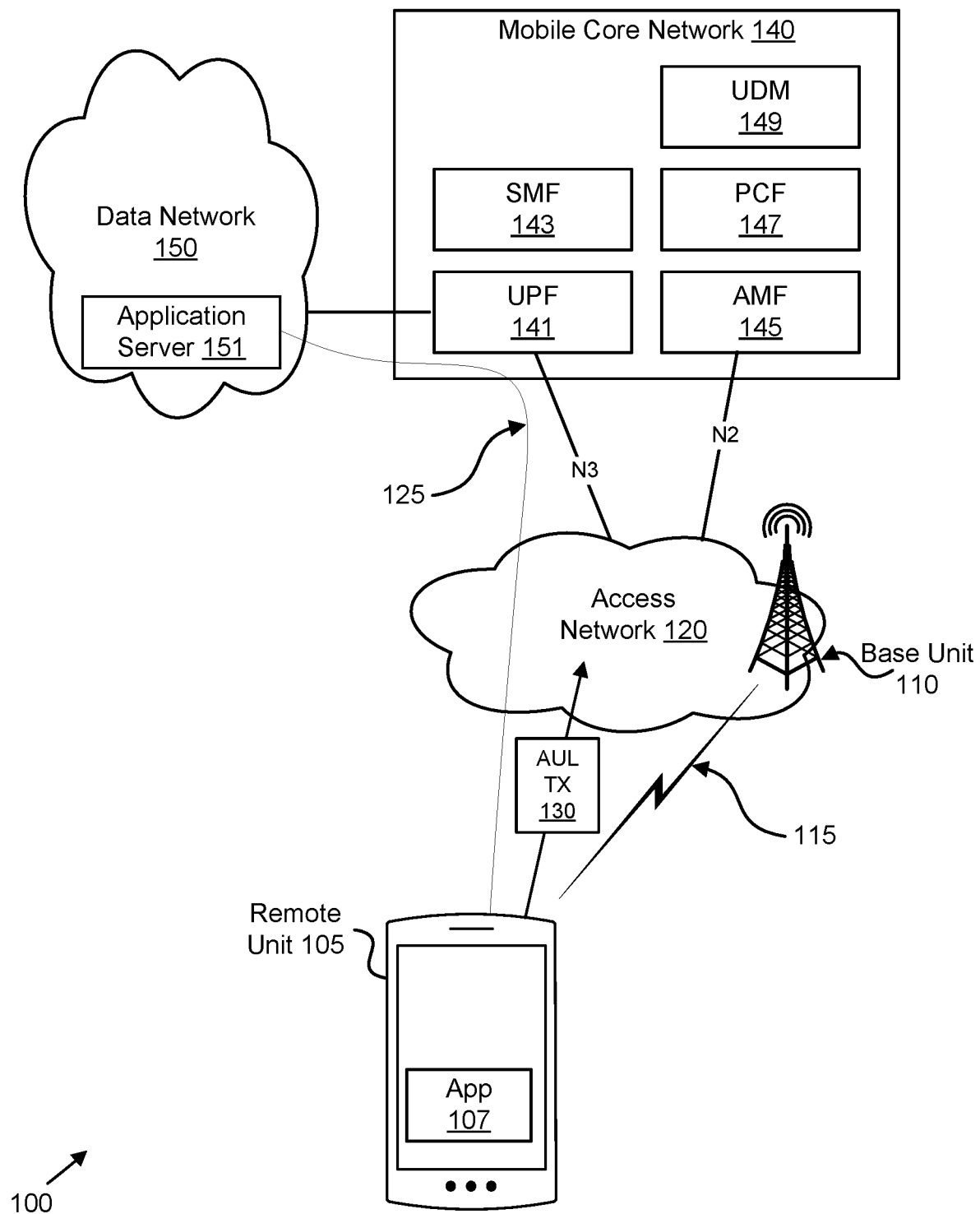
FIG. 1 is a schematic block diagram illustrating one embodiment of a wireless communication system for communicating UCI with CRC in an autonomous uplink transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts a wireless communication system 100 for communicating UCI with CRC in an autonomous uplink transmission, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote server, such as the application server ("AS") 151, via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the AS 151 using the PDU connection to the data network 150. Note that an application 107 may communicate with the AS 151 using a PDU session, or similar data connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120. In one embodiment, the access network 120 is a 3GPP access network, such as 5G-RAN, E-UTRAN, or the like.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 145, a Session Management Function ("SMF") 143, and a Policy Control Function ("PCF") 147. Additionally, the mobile core network 140 includes a user plane function ("UPF") 141 and a Unified Data Management ("UDM") 149. Although specific numbers and types of network functions are depicted in FIG. 1, one of skill in the art will recognize that any number and type of network functions may be included in the mobile core network 140. In some embodiments, the mobile core network 140 may include multiple network slices. In such embodiments, each slice may include one or more network functions ("NFs"), such as user plane functions ("UPF") and/or control plane functions, such as a SMFs and the like.

In some embodiments, a remote unit 105 may send autonomous uplink ("AUL") transmissions 130 to the access network 120 (e.g., to the base unit 110 in the access network 120). For example, the application 107 may generate data for AUL transmissions. Here, the AUL transmission is to include UCI. Further, the UCI includes CRC parity bits and indicates the identity of the remote unit 105, referred to as a UE-ID. In various embodiments, the UE-ID may be a RNTI, such as a cell RNTI ("C-RNTI") and an AUL-specific RNTI ("AUL-RNTI"). In some embodiments, the CRC and UE ID are the same size (e.g., are composed of the same number of bits). In other embodiments, the CRC and UE-ID are different sizes.

In various embodiments, the remote unit 105 may improve the efficiency of the UCI by scrambling (e.g., encoding) the CRC bits using all or a part of the UE-ID. Likewise, a base unit 110 may use the UE-ID (e.g., RNTI) of the remote unit 105 scheduled for AUL to unscramble (e.g., decode) the CRC parity bits of UCI in received AUL transmissions 130. Moreover, the base unit 110 may associate the AUL transmission 115 with a particular remote unit served by the base unit 110 in response to successfully unscrambling the CRC with a network identifier belonging to that particular remote unit. Where multiple remote units 105 are scheduled for AUL, the base unit 110 may attempt to unscramble the CRC using the RNTIs of the multiple remote units 105 until successfully unscrambling the CRC.

Figure 2:
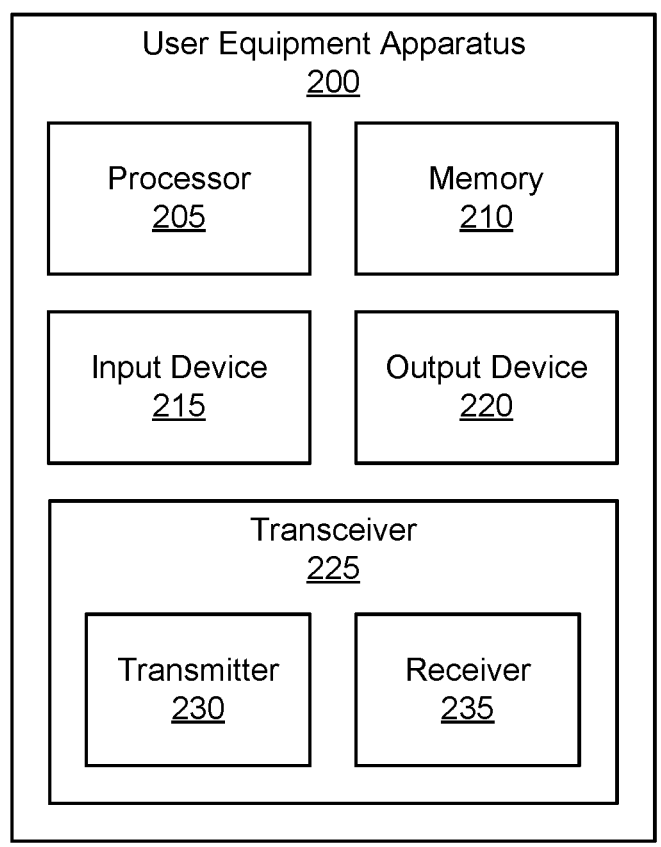
FIG. 2 is a schematic block diagram illustrating one embodiment of a user equipment apparatus that may be used for communicating UCI with CRC in an autonomous uplink transmission.

FIG. 2 depicts one embodiment of a user equipment apparatus 200 that may be used for communicating UCI with CRC in an autonomous uplink transmission. The user equipment apparatus 200 may be one embodiment of the remote unit 105. Furthermore, the user equipment apparatus 200 may include a processor 205, a memory 210, an input device 215, an output device 220, and a transceiver 225. In some embodiments, the input device 215 and the output device 220 are combined into a single device, such as a touchscreen. In certain embodiments, the user equipment apparatus 200 may not include any input device 215 and/or output device 220. In various embodiments, the user equipment apparatus 200 may include one or more of the processor 205, the memory 210, and the transceiver 225, and may not include the input device 215 and/or the output device 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, and the transceiver 225.

In various embodiments, the transceiver 225 receives a control signal from the mobile communication network (e.g., from the base unit 110 in the access network 120) to enable autonomous uplink ("AUL") transmission. Thereafter, the processor 205 determines to transmit data in an AUL transmission. For example, an operating system or controller algorithm running on the processor 205 may detect that an application 107 running on the user equipment apparatus 200 has data to transmit via AUL transmission. In response to this determination/trigger, the processor 205 generates UCI to accompany the AUL transmission. Here, the UCI comprises a CRC. Moreover, the UCI also indicates an identifier of the user equipment apparatus 200 (UE-ID). In various embodiments, the identifier is a RNTI, such as a C-RNTI or an AUL-RNTI. Note that the UCI may also include a HARQ process identifier, a new data indicator, and a redundancy version.

In some embodiments, the processor 205 generates the UCI to accompany the AUL transmission by scrambling the CRC using one or more bits from the UE-ID. In one embodiment, the CRC and UE-ID have the same size, for example a size of 16 bits. In such embodiments, scrambling the CRC using one or more bits from the UE-ID results in a scrambled CRC with size of 16-bits. Where the CRC is scrambled using the UE-ID, the resulting UCI may consist of the HARQ process ID, the NDI, the RV, and the scrambled CRC.

In another embodiment, the CRC and UE-ID are different sizes, for example with the UE-ID being larger than the CRC. As an example, the UE-ID may be 16 bits while the CRC is 8 bits. Here, scrambling the CRC using one or more bits from the UE-ID may include separating the UE-ID into two portions: a portion that matches the size of the CRC and the remaining UE-ID bits. In such embodiments, generating the UCI to accompany the AUL transmission includes scrambling the CRC with the portion that matches the size of the CRC. The remaining UE-ID bits may be included in a separate field of the UCI. Where the CRC is scrambled using a portion of the UE-ID, the resulting UCI may consist of the HARQ process ID, the NDI, the RV, a portion of the UE-ID (e.g., the portion not used to scramble the CRC), and the scrambled CRC. In certain embodiments, the portion of the UE-ID used to scramble the CRC may be the least significant UE-ID bits, while the most significant UE-ID bits are placed within the separate field of the UCI.

Having generated the UCI, the processor 205 controls the transceiver 225 to send the UCI with the AUL transmission to a base unit 110 (e.g., an eNB or a gNB), wherein the AUL transmission comprises the UCI.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data related to UCI in autonomous uplink transmissions. For example, the memory 210 may store one or more network identifiers (e.g., RNTIs) assigned to the user equipment apparatus 200. Additionally, the memory 210 may store data for transmitting via AUL transmissions, UCI, CRC parity bits for the UCI, and the like. In certain embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, is designed to output visual, audible, and/or haptic signals. In some embodiments, the output device 220 includes an electronically controllable display or display device capable of outputting visual data to a user. For example, the output device 220 may include, but is not limited to, an LCD display, an LED display, an OLED display, a projector, or similar display device capable of outputting images, text, or the like to a user. As another, non-limiting, example, the output device 220 may include a wearable display separate from, but communicatively coupled to, the rest of the user equipment apparatus 200, such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, the output device 220 may be located near the input device 215.

The transceiver 225 includes at least transmitter 230 and at least one receiver 235. One or more transmitters 230 may be used to provide UL communication signals to a base unit 110, such as the AUL transmissions described herein. Similarly, one or more receivers 235 may be used to receive DL communication signals from the base unit 110, as described herein. Although only one transmitter 230 and one receiver 235 are illustrated, the user equipment apparatus 200 may have any suitable number of transmitters 230 and receivers 235. Further, the transmitter(s) 225 and the receiver(s) 230 may be any suitable type of transmitters and receivers. In one embodiment, the transceiver 225 includes a first transmitter/receiver pair used to communicate with a mobile communication network over licensed radio spectrum and a second transmitter/receiver pair used to communicate with a mobile communication network over unlicensed radio spectrum.

In autonomous uplink ("AUL") transmissions, a UE (e.g., the remote unit 105 and/or user equipment apparatus 200) only receives a DCI to enable/disable AUL. That DCI includes parameters for the uplink transmissions such as the resource block assignment ("RBA") and MCS. Any AUL transmissions are then done without new DCI whenever the UE can access the channel and has data in its transmit buffer. The physical resources for UCI transmissions preferably follow the mapping of CQI/PMI on the PUSCH resource elements Additionally, RRC signaling is used to configure how many (and which) UL HARQ processes are allowed for AUL transmission(s). The AUL supports transmissions of a new transport block as well as retransmissions. At the same time, the eNB (e.g., the base unit 110) is generally not necessarily aware which UE is transmitting a given AUL transmission.

Since the AUL transmission is grant-free, there is no eNB signalling to determine neither the HARQ ID, nor the NDI, nor the RV of the PUSCH data. Even though the HARQ ID could be derived by a formula from a subframe index, still the NDI and RV need to be indicated explicitly by the UE in a UCI that accompanies the PUSCH data. A UE-ID is also required to identify the transmitter, since the eNB may have enabled the same resources for multiple UEs. Therefore, the UE includes UCI in the AUL transmission to inform the eNB of the corresponding transmission parameters.

However, the overhead of the UCI consumes PUSCH resources, thereby reducing user data throughput. The present disclosure introduces a 16-bit CRC for UCI, wherein the CRC is scrambled using the UE-ID (e.g., the UE's RNTI). Because the scrambled CRC encodes the UE-ID, the UE-ID is not included in the UCI and the overall UCI size is reduced, thus minimizing overhead. Alternatively, the conventional 8-bit CRC for UCI is retained, and the UE-ID (e.g., the UE RNTI) is split into two parts, where one part is included as an explicit UCI field, and the remaining part is used to scramble the 8-bit CRC of the UCI.

Figure 3:
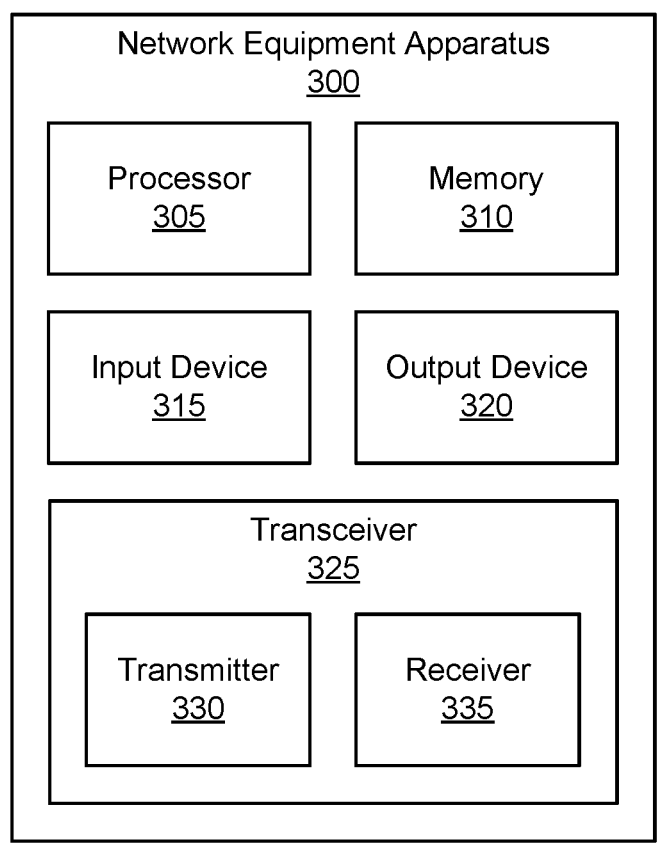
FIG. 3 is a schematic block diagram illustrating one embodiment of a network equipment apparatus that may be used for communicating UCI with CRC in an autonomous uplink transmission.

FIG. 3 depicts one embodiment of a network equipment apparatus 300 that may be used for communicating UCI with CRC in an autonomous uplink transmission. The network equipment apparatus 300 may be one embodiment of the remote unit 105. Furthermore, the network equipment apparatus 300 may include a processor 305, a memory 310, an input device 315, an output device 320, and a transceiver 325. In some embodiments, the input device 315 and the output device 320 are combined into a single device, such as a touchscreen. In certain embodiments, the network equipment apparatus 300 may not include any input device 315 and/or output device 320. In various embodiments, the network equipment apparatus 300 may include one or more of the processor 305, the memory 310, and the transceiver 325, and may not include the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 is configured to send (e.g., via the transceiver 325) a control signal to a UE (e.g., a remote unit 105) to enable autonomous uplink ("AUL") transmission at the UE. For example, the processor 305 may control the transceiver 325 to send DCI to enable/disable AUL. That DCI may include parameters for the uplink transmissions such as the RBA and MCS. In certain embodiments, the processor 305 configures the UE for AUL transmission, for example via RRC signaling.

Thereafter, the transceiver 325 may receive an AUL transmission from the UE. Here, the AUL transmission may include UCI, wherein the UCI includes a CRC and also indicates an identifier of the UE (e.g., a UE-ID). In various embodiments, the identifier is a RNTI, such as a C-RNTI or an AUL-RNTI assigned to the UE. Note that the UCI may also include a HARQ process identifier, a new data indicator, and a redundancy version.

In some embodiments, the CRC is scrambled using one or more bits from the UE-ID. In such embodiments, the processor 305 unscrambles (e.g., decodes) the CRC parity bits of UCI in received AUL transmission using the UE-ID (e.g., RNTI) of the UE. In certain embodiments, the processor 305 may attempt to unscramble the CRC using the RNTIs of the multiple UEs it serves until successfully unscrambling the CRC.

In certain embodiments, the CRC and UE-ID have the same size, for example a size of 16 bits. In such embodiments, scrambling the CRC using one or more bits from the UE-ID results in a scrambled CRC with size of 16-bits. Where the CRC is scrambled using the UE-ID, the resulting UCI may consist of the HARQ process ID, the NDI, the RV, and the scrambled CRC.

In another embodiment, the CRC and UE-ID are different sizes, for example with the UE-ID being larger than the CRC. As an example, the UE-ID may be 16 bits while the CRC is 8 bits. Here, scrambling the CRC using one or more bits from the UE-ID may include separating the UE-ID into two portions: a portion that matches the size of the CRC and the remaining UE-ID bits. In such embodiments, the UCI that accompanies the AUL transmission may include remaining UE-ID bits in a separate field of the UCI. Where the CRC is scrambled using a portion of the UE-ID, the resulting UCI may consist of the HARQ process ID, the NDI, the RV, a portion of the UE-ID (e.g., the portion not used to scramble the CRC), and the scrambled CRC. In certain embodiments, the portion of the UE-ID used to scramble the CRC may be the least significant UE-ID bits, while the most significant UE-ID bits are placed within the separate field of the UCI.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to UCI in autonomous uplink transmissions. For example, the memory 310 may store one or more network identifiers (e.g., RNTIs) assigned to the network equipment apparatus 300. Additionally, the memory 310 may store data for transmitting via AUL transmissions, UCI, CRC parity bits for the UCI, and the like. In certain embodiments, the memory 310 also stores program code and related data, such as an operating system or other controller algorithms operating on the remote unit 105.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the network equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. One or more transmitters 330 may be used to provide DL communication signals to a remote unit 105, such as DCI. Similarly, one or more receivers 335 may be used to receive UL communication signals from the remote unit, such as AUL transmissions accompanied by UCI, as described herein. Although only one transmitter 330 and one receiver 335 are illustrated, the network equipment apparatus 300 may have any suitable number of transmitters 330 and receivers 335. Further, the transmitter(s) 325 and the receiver(s) 330 may be any suitable type of transmitters and receivers.

Figure 4:
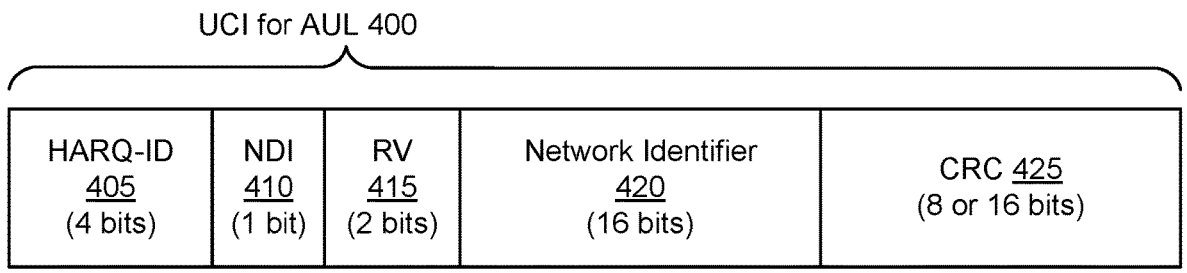
FIG. 4 is a block diagram illustrating a first embodiment of UCI containing CRC parity bits according to embodiments of the disclosure.

FIG. 4 shows one embodiment of UCI 400 to be sent with AUL, according to embodiments of the disclosure. The UCI 400 contains the following information: the HARQ-ID 405 (generally 4 bits for supporting up to 16 HARQ processes), the NDI 410 (1 bit), the RV 415 (2 bits), a network identifier 420 (e.g. a UE-ID such as C-RNTI or AUL-RNTI, typically 16 bits), and CRC 425 (e.g., 8 or 16 bits).

Generally, the UE-ID is 16 bits long (e.g. C-RNTI). UCI may be protected by a CRC of 8 or 16 bits. The CRC parity bits allows detection of AUL over noise. Here, the 16 bits of UE-ID and 8 bits of CRC results in a total UCI overhead (before channel coding) of up to 31 bits (39 bits where a 16 bit CRC is used). Note that total length may be less where the number of HARQ processes is 8 or fewer (meaning the HARQ-ID can be 3 bits or less).

In some embodiments, for UCI the UE-ID (C-RNTI) is used to scramble the CRC, thus saving UCI overhead. Scrambling a 16-bit CRC length by a 16-bit RNTI is straightforward as the two lengths match. However, it is not straightforward how to scramble an 8-bit CRC by a 16-bit RNTI. To solve this problem, a reduced UE-ID may be introduced that is limited to 8 bits, such as the 8 least significant bits of the RNTI. Alternatively, the CRC may be scrambled with only a portion of the UE-ID bits.

Figure 5:
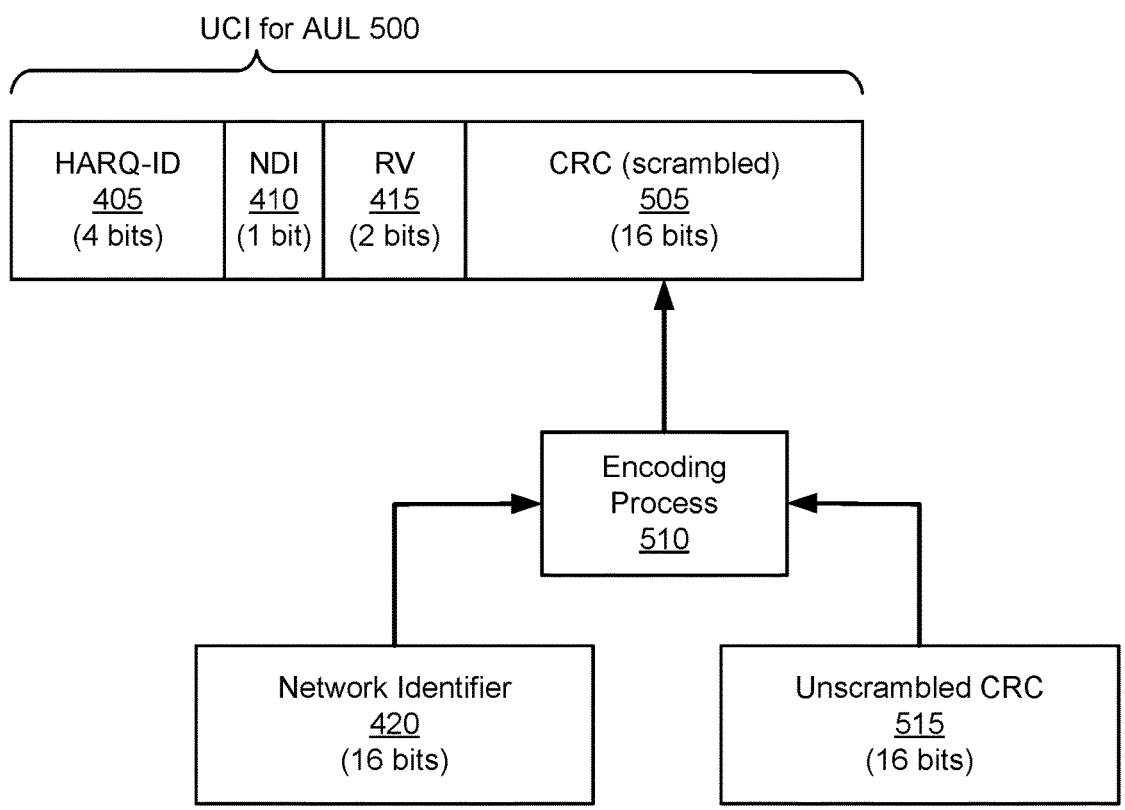
FIG. 5 is a block diagram illustrating a second embodiment of UCI containing CRC parity bits according to embodiments of the disclosure.
Figure 6:
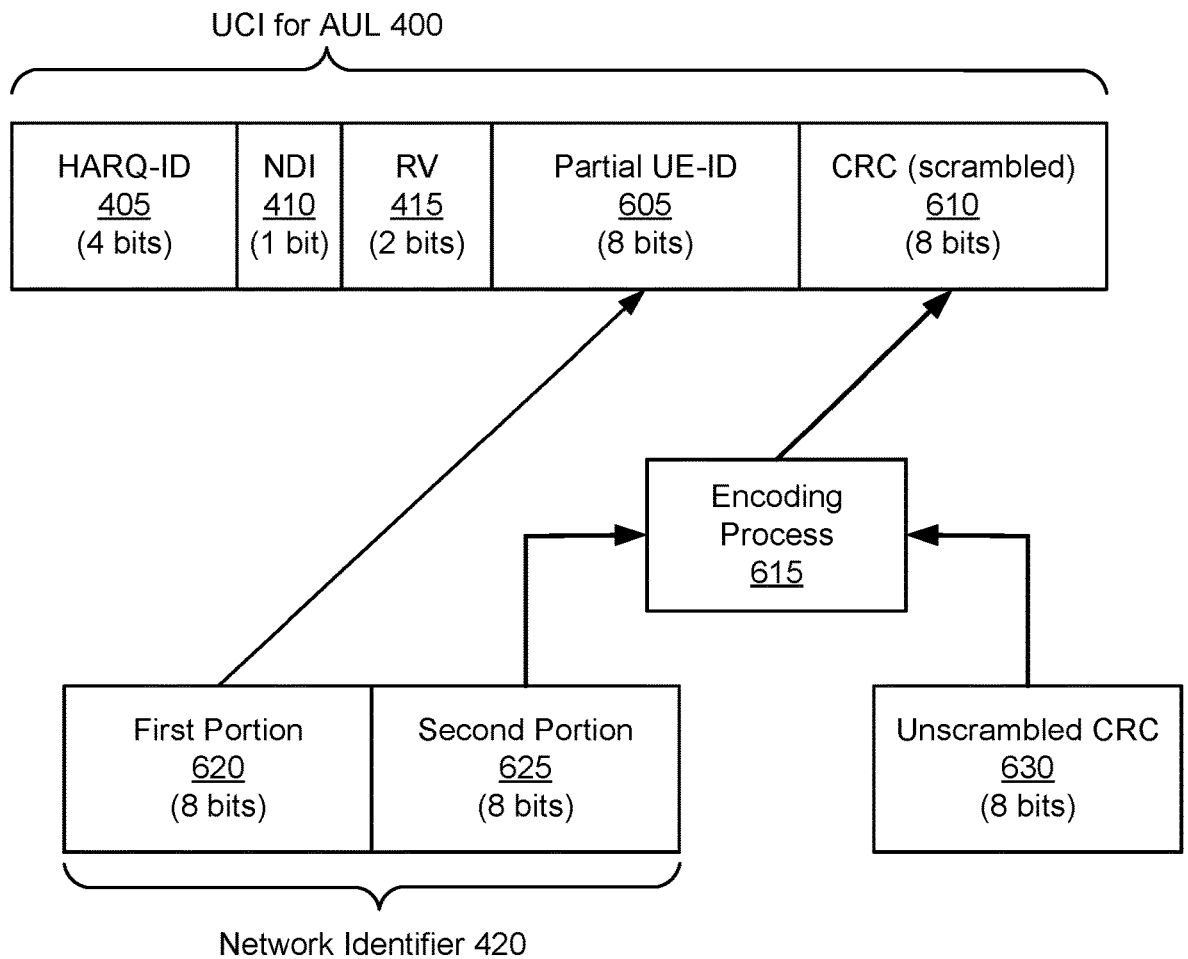
FIG. 6 is a block diagram illustrating a third embodiment of UCI containing CRC parity bits according to embodiments of the disclosure.

FIGS. 5 and 6 show embodiments of scrambling the CRC of the UCI with a 16-bit UE ID. FIG. 5 shows a first embodiment where the CRC and the UE ID are the same size (e.g., 16 bits). FIG. 6 shows a second embodiment where the CRC is smaller than the UE ID (e.g., an 8-bit CRC and 16-bit UE-ID).

Referring to FIG. 5, in the first embodiment the UCI 500 for AUL transmission is protected by a 16-bit CRC that is scrambled by the UE ID (e.g. C-RNTI or AUL-RNTI) according to embodiments of the disclosure. For the UCI 500, the mobile unit generating the UCI 500 has a 16-bit network identifier 420 and the unscrambled CRC 515 also has a length of 16 bits. In certain embodiments, the network identifier 420 may be a RNTI, such as a cell RNTI ("C-RNTI") or an AUL-specific RNTI ("AUL-RNTI").

As depicted, the UCI 500 consists of a hybrid automatic repeat request process identifier ("HARQ-ID") field 405 (up to 4 bits for supporting up to 16 processes), a new data indicator ("NDP") 410 (1 bit), a redundancy version ("RV") value 415 (2 bits), and the scrambled CRC 505. That means that with the above exemplary UCI numerology, the total UCI overhead is 23 bits prior to FEC.

In certain embodiments, implementation of the 16-bit CRC requires introduction of a new uplink CRC generator. The mobile unit generates the unscrambled CRC 515 corresponding to the UCI 500 and then uses the network identifier 420 to generate the scrambled CRC 505, as shown in encoding process 510. Here, the unscrambled CRC 515 and the network identifier 420 are inputs to the encoding process 510. Note that the UCI 500 is more efficient than the UCI 400 due to using fewer bits in the UCI (e.g., prior to channel coding). Beneficially, the first embodiment improves protection against a false detection due to the larger CRC size.

Referring to FIG. 6, in the second embodiment the UCI 600 is protected by an 8-bit CRC. Here, the 8 CRC bits are scrambled by 8 bits from the 16-bit UE-ID (e.g. the 8 LSBs). In order to avoid the limit of 256 UEs, the remaining (e.g. MSBs) of the UE-ID are included as explicit field in the UCI. As depicted, the UCI 600 consists of a hybrid automatic repeat request process identifier ("HARQ-ID") field 605 (4 bits), a new data indicator ("NDP") 610 (1 bit), a redundancy version ("RV") value 615 (2 bits), a partial UE identifier 620, and the scrambled CRC 625. For the UCI 600, the mobile unit generating the UCI 600 has a 16-bit network identifier 630 separated into a first portion 635 (e.g., the MSBs) and a second portion 640 (e.g., the LSBs). This results in a total UCI overhead of 23 bits prior to FEC encoding. Beneficially, the second embodiment is compatible with existing uplink CRC generators.

As depicted in FIG. 6, the first portion 635 may correspond to the most significant bits (MSBs) of the network identifier 630 and the second portion 640 may correspond to the least significant bits (LSBs), where the 8-bit CRC 625 is scrambled using the least significant bits of the network identifier 630. Alternatively, the first portion 635 may correspond to the least significant bits of the network identifier 630 and the second portion 640 may correspond to the most significant bits, such that the CRC is scrambled using the most significant bits of the network identifier 630.

In certain embodiments, the network identifier 420 may be a RNTI, such as a cell RNTI ("C-RNTI") or an AUL-specific RNTI ("AUL-RNTI"). The mobile unit generates an unscrambled CRC 630 corresponding to the UCI 600. Because the CRC 630 and the network identifier 420 are unequal lengths, the network identifier is split into two portions: one with a size matching the unscramble CRC 630, and another comprising the remaining bits of the UE-ID. Here, the second portion 625 (corresponding to the 8 least significant bits) is selected as the portion matching the length of the CRC, and the CRC is scrambled using the second portion 625 to generate the scrambled CRC 625, as shown in encoding process 615. Here, the unscrambled CRC 630 and the second portion 625 are inputs to the encoding process 615. Note that in other embodiments, the first 8 bits (e.g., most significant bits) of the network identifier 420 may be used to scramble the CRC parity bits. Also, note that the UCI 600 is more efficient than the UCI 400 due to using fewer bits in the UCI (e.g., prior to channel coding).

Figure 7:
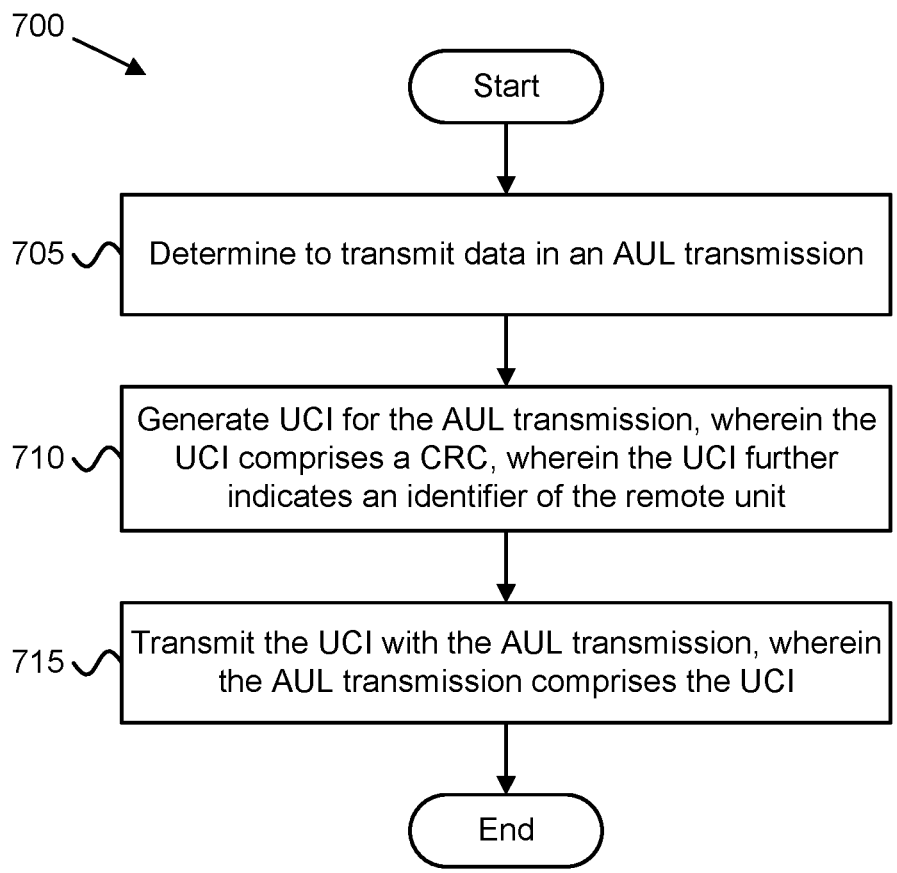
FIG. 7 is a block diagram illustrating one embodiment of a method for communicating UCI with CRC in an autonomous uplink transmission.

FIG. 7 depicts a method 700 for communicating UCI with CRC in an autonomous uplink transmission, according to embodiments of the disclosure. In some embodiments, the method 700 is performed by an apparatus, such as the remote unit 105, the UE 205, and/or the network equipment apparatus 300. In certain embodiments, the method 700 may be performed by a processor executing program code, for example, a microcontroller, a microprocessor, a CPU, a GPU, an auxiliary processing unit, a FPGA, or the like.

The method 700 begins and determines 705 to transmit data in an AUL transmission. In certain embodiments, the apparatus receives data from an internal application to be transmitted on PUSCH.

The method 700 includes generating 710 UCI for the AUL transmission. In various embodiments, the UCI includes a plurality of CRC parity bits and also indicates an identity of the apparatus. In certain embodiments, the CRC parity bits are scrambled based on the identity of the apparatus. In certain embodiments, the UCI includes a UE identity field. In further embodiments, the UCI may include both a UE identity field and a CRC that is scrambled based on the UE identity. For example, a first portion of the UE identity may be included in the UE identity field while a second portion of the UE identity may be used to scramble the CRC parity bits. In various embodiments, the UCI also includes a HARQ process identifier, a new data indicator, and RV value.

The method 700 includes transmitting 715 the UCI with the AUL transmission. In various embodiments, the AUL transmission comprises the UCI. The method 700 ends.

Disclosed herein is a first apparatus (e.g., a UE) for transmitting uplink control information ("UCI") with an autonomous uplink ("AUL") transmission. The first apparatus includes a processor and a transceiver that receives a control signal to enable AUL transmission. The processor determines to transmit data in an AUL transmission and generates UCI for the AUL transmission. Here, the UCI comprises a cyclic redundancy check ("CRC"). Additionally, the UCI further indicates an identifier of the remote unit. The processor transmits, via the transceiver, the UCI with the AUL transmission, wherein the AUL transmission comprises the UCI.

In some embodiments, the UCI consists of a hybrid automatic repeat request ("HARQ") process identifier, a new data indicator, a redundancy version ("RV") value, a remote unit identification field, and the CRC. In such embodiments, the identifier is a radio network temporary identifier ("RNTI"). In certain embodiments, the RNTI is one of a cell RNTI ("C-RNTI") and an AUL-specific RNTI ("AUL-RNTI").

In various embodiments, both the CRC and the identifier of the remote unit have a size of 16 bits. In some embodiments, generating the UCI for the AUL transmission comprises scrambling the CRC using the identifier of the remote unit. In such embodiments, the UCI consists of a hybrid automatic repeat request ("HARQ") process identifier, a new data indicator, a redundancy version ("RV") value, and the scrambled CRC.

In some embodiments, the identifier consists of a first portion and a second portion, wherein both the CRC and the second portion are a common size, and wherein generating the UCI for the AUL transmission comprises scrambling the CRC with the second portion of the identifier. In such embodiments, the UCI consists of a hybrid automatic repeat request ("HARQ") process identifier, a new data indicator, a redundancy version ("RV") value, the first portion of the identifier, and the scrambled CRC. In certain embodiments, the identifier is a radio network temporary identifier ("RNTI"), wherein the first portion of the identifier consists of the most significant bits of the RNTI, and wherein the second portion of the identifier consists of the least significant bits of the RNTI.

Disclosed herein is a first method (e.g., performed by a UE) for transmitting uplink control information ("UCI") with an autonomous uplink ("AUL") transmission. The first method includes generating uplink control information ("UCI") for the AUL transmission, wherein the UCI comprises a cyclic redundancy check ("CRC"), wherein the UCI further indicates an identifier of the remote unit. The method includes transmitting, to a base unit, the UCI with the AUL transmission, wherein the AUL transmission comprises the UCI.

In some embodiments, the UCI consists of a hybrid automatic repeat request ("HARQ") process identifier, a new data indicator, a redundancy version ("RV") value, a remote unit identification field, and the CRC. In such embodiments, the identifier may be a radio network temporary identifier ("RNTI"). In certain embodiments, the RNTI may be one of a cell RNTI ("C-RNTI") and an AUL-specific RNTI ("AUL-RNTI").

In some embodiments, both the CRC and the identifier of the remote unit have a size of 16 bits. In certain embodiments, generating the UCI for the AUL transmission comprises scrambling the CRC using the identifier of the remote unit. In such embodiments, the UCI may consist of a hybrid automatic repeat request ("HARQ") process identifier, a new data indicator, a redundancy version ("RV") value, and the scrambled CRC.

In certain embodiments, the identifier consists of a first portion and a second portion, wherein both the CRC and the second portion are a common size, and wherein generating the UCI for the AUL transmission comprises scrambling the CRC with the second portion of the identifier. In such embodiments, the UCI may consist of a hybrid automatic repeat request ("HARQ") process identifier, a new data indicator, a redundancy version ("RV") value, the first portion of the identifier, and the scrambled CRC. In certain embodiments, the identifier may be a radio network temporary identifier ("RNTI"), wherein the first portion of the identifier consists of the most significant bits of the RNTI and the second portion of the identifier consists of the least significant bits of the RNTI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a transceiver that receives a control signal to enable autonomous uplink ("AUL") transmission; and
a processor that:
determines to transmit data in an AUL transmission;
scrambles a cyclic redundancy check ("CRC") by a first portion of an identifier of the remote unit, wherein the identifier comprises more bits than the CRC, wherein the identifier consists of the first portion and a second portion, wherein both the CRC and the first portion are a common size, and wherein the first portion and the second portion correspond to different bits of the identifier;

generates uplink control information ("UCI") for the AUL transmission, wherein the UCI comprises a hybrid automatic repeat request ("HARQ") process identifier, a new data indicator, a redundancy version ("RV") value, the second portion of the identifier, and the scrambled CRC; and transmits, via the transceiver, the UCI with the AUL transmission, wherein the AUL transmission comprises the UCI.

2. The apparatus of claim 1, wherein the identifier is a radio network temporary identifier ("RNTI").

3. The apparatus of claim 2, wherein the RNTI is one of a cell RNTI ("C-RNTI") and an AUL-specific RNTI ("AUL-RNTI").

4. The apparatus of claim 1, wherein generating the UCI for the AUL transmission comprises scrambling the CRC using the identifier of the remote unit.

5. The apparatus of claim 1, wherein the UCI consists of said HARQ process identifier, said new data indicator, said RV value, said second portion of the identifier of the remote unit, and said CRC that is scrambled by the first portion of the identifier of the remote unit.

6. The apparatus of claim 1, wherein the identifier is a radio network temporary identifier ("RNTI"), wherein the second portion of the identifier consists of the most significant bits of the RNTI, and wherein the first portion of the identifier consists of the least significant bits of the RNTI.

7. A method comprising:
    determining, at a remote unit, to transmit data in an autonomous uplink ("AUL") transmission;
    scrambling a cyclic redundancy check ("CRC") by a first portion of an identifier of the remote unit, wherein the identifier comprises more bits than the CRC, wherein the identifier consists of the first portion and a second portion, wherein both the CRC and the first portion are a common size, and wherein the first portion and the second portion correspond to different bits of the identifier;
    generating uplink control information ("UCI") for the AUL transmission, wherein the UCI comprises a hybrid automatic repeat request ("HARQ") process identifier, a new data indicator, a redundancy version ("RV") value, the second portion of the identifier, and the scrambled CRC; and
    transmitting, to a base unit, the UCI with the AUL transmission, wherein the AUL transmission comprises the UCI.

8. The method of claim 7, wherein the identifier is a radio network temporary identifier ("RNTI").

9. The method of claim 8, wherein the RNTI is one of a cell RNTI ("C-RNTI") and an AUL-specific RNTI ("AUL-RNTI").

10. The method of claim 7, wherein generating the UCI for the AUL transmission comprises scrambling the CRC using the identifier of the remote unit.

11. The method of claim 7, wherein the UCI consists of said HARQ process identifier, said new data indicator, said RV value, said second portion of the identifier of the remote unit, and the scrambled said CRC that is scrambled by the first portion of the identifier of the remote unit.

12. The method of claim 7, wherein the identifier is a radio network temporary identifier ("RNTI"), wherein the second portion of the identifier consists of the most significant bits of the RNTI, and wherein the first portion of the identifier consists of the least significant bits of the RNTI.

* * * * *